United States Patent [19]

Hammond et al.

[11] Patent Number: 5,006,972

[45] Date of Patent: Apr. 9, 1991

[54] SEA WATER BATTERY POWER CONVERTER

[75] Inventors: Russell E. Hammond; John L. Henry, San Diego, both of Calif.

[73] Assignee: The United States of America as represented by the Secretary of the Navy, Washington, D.C.

[21] Appl. No.: 579,201

[22] Filed: Sep. 4, 1990

Related U.S. Application Data

[63] Continuation of Ser. No. 353,585, May 18, 1989, abandoned.

[51] Int. Cl.[5] .............................................. H02M 3/337
[52] U.S. Cl. ........................................ 363/24; 363/49
[58] Field of Search .................................. 363/24–26, 363/49, 134; 323/906

[56] References Cited

U.S. PATENT DOCUMENTS

| | | | |
|---|---|---|---|
| 3,470,032 | 9/1969 | Egan . | |
| 4,241,395 | 12/1980 | Stacey et al. | 363/39 |
| 4,519,024 | 5/1985 | Federico et al. | 363/127 |
| 4,685,039 | 8/1987 | Inou et al. | 363/16 |
| 4,695,935 | 9/1987 | Oen et al. | 363/26 |

FOREIGN PATENT DOCUMENTS

| | | | |
|---|---|---|---|
| 13041 | 6/1969 | Japan | 363/134 |
| 147980 | 11/1980 | Japan | 363/25 |

OTHER PUBLICATIONS

Mele, "100-kHz DC/DC Converter Uses FET's", EDN, vol. 25, No. 17, p. 1912, Sep. 20, 1980.
Durgavich, "Compact DC-DC Converter Yields +15V from +5V," Electronics, vol. 48, No. 12, p. 103, Jun. 12, 1975.
Blöckl et al., "New Solid State Components Simplify and Improve Switching Power Supplies," Siemens Components XV, Sep. 1980, No. 4, p. 181-186.

Primary Examiner—William H. Beha, Jr.
Attorney, Agent, or Firm—Harvey Fendelman; Thomas G. Keough; Michael A. Kagan

[57] ABSTRACT

The invention converts the voltage output of a DC source to a higher voltage. A germanium transistor start-up circuit receives a DC supply voltage input and includes an astable multivibrator which produces a square wave voltage output that is transformed to a substantially DC steady-state voltage output by a transformer and a capacitor. This elevated voltage is provided to an oscillator circuit which provides two square wave outputs. Each output is provided to an array of invertors operably coupled to an array of field effect transistors. The transistors are operably coupled to a power transformer. The square wave outputs of the power transformer are full wave rectified to provide a DC output having a higher voltage than the system input voltage. The power transformer also provides another full wave rectified voltage which disables the start-up circuit to eliminate parasitic energy losses attributable to its continued oscillation.

15 Claims, 4 Drawing Sheets

SEA WATER BATTERY POWER CONVERTER

STATEMENT OF GOVERNMENT INTEREST

The invention described herein may be manufactured and used by or for the Government of the United States of America for governmental purposes without the payment of any royalties thereon or therefor.

This is a continuation of application Ser. No. 07/353,585, filed May 18, 1989, now abandoned.

BACKGROUND OF THE INVENTION

The present invention relates to a power converter of the type which elevates a low level DC voltage to a higher level DC voltage. More particularly the present invention relates to elevating the voltage of a seawater battery.

The Navy uses many devices deployed at sea which require independent electrical power such as ocean sensors (temperature, salinity, etc.) undersea search vehicles, underwater weapons and telemetry systems. The power packages for these types of devices should be compact, low cost, light weight, and safe. The Navy has developed lithium batteries for some of these devices, however lithium batteries are costly and can explode when shorted. Other types of batteries, such as carbon-zinc dry cells, lead oxide cells, and silver-zinc cells do not have sufficient energy densities for most of these types of devices. Many of the prior art batteries also suffer from being depth sensitive and/or having a short term power capability.

A seawater battery can provide a safe, high energy density, low cost deep ocean power source for applications which require low power and long endurance. However, a disadvantage of seawater batteries is that they provide a low voltage output, typically around one volt DC, which is too low for many solid state applications. Therefore, a need exists for an efficient means for transforming the low voltage output of a low voltage direct current source, such as a seawater battery, to a higher voltage.

SUMMARY OF THE INVENTION

The present invention provides an efficient power converter for elevating a direct current voltage to a higher voltage without an external power source. The present invention is well suited for elevating the voltage output of a seawater battery to a higher voltage. The output of a seawater battery, which is typically in the range of 0 to 1 volt, is provided to a germanium transistor start-up circuit which comprises an astable multivibrator. The start-up circuit provides an output to an oscillator circuit which outputs two square waves having a phase-lag between them. Each square wave is directed to an invertor which is coupled to an array of parallel field effect transistors. The outputs of the field effect transistors are provided to a power transformer which steps the signal voltage. The output of the power transformer are also a pair of square waves which are then full wave rectified to provide an output which may range from 3 to 30 vdc, suitable as the voltage input to many solid state circuits. A third secondary winding of the power transformer provides a housekeeping output which is also full wave rectified that ensures adequate energy inputs into the invertors and to disable the germanium start-up circuit to avoid unnecessary power drains on the seawater battery.

OBJECTS OF THE INVENTION

An object of the present invention is to provide an efficient method and apparatus for stepping up a low voltage input to a higher voltage without an external power source.

A second object of the present invention is to provide a method and apparatus for stepping up the voltage of a seawater battery without an external power source.

A third object of the present invention is to provide an apparatus and method for stepping up the voltage of a seawater battery in an efficient manner.

These and other objects of the invention will become more readily apparent from the ensuing specification when considered together with the drawings.

BRIEF DESCRIPTION OF THE DRAWINGS

FIGS. 1A and 1B connect at connectors A, B, C, D, E, and F, illustrated in FIGS. 1A and 1B.

FIGS. 2A and 2B connect at connectors A, B, C, D, E, and F, illustrated in FIGS. 2A and 2B.

DESCRIPTION OF THE PREFERRED EMBODIMENT

Figure 1A:
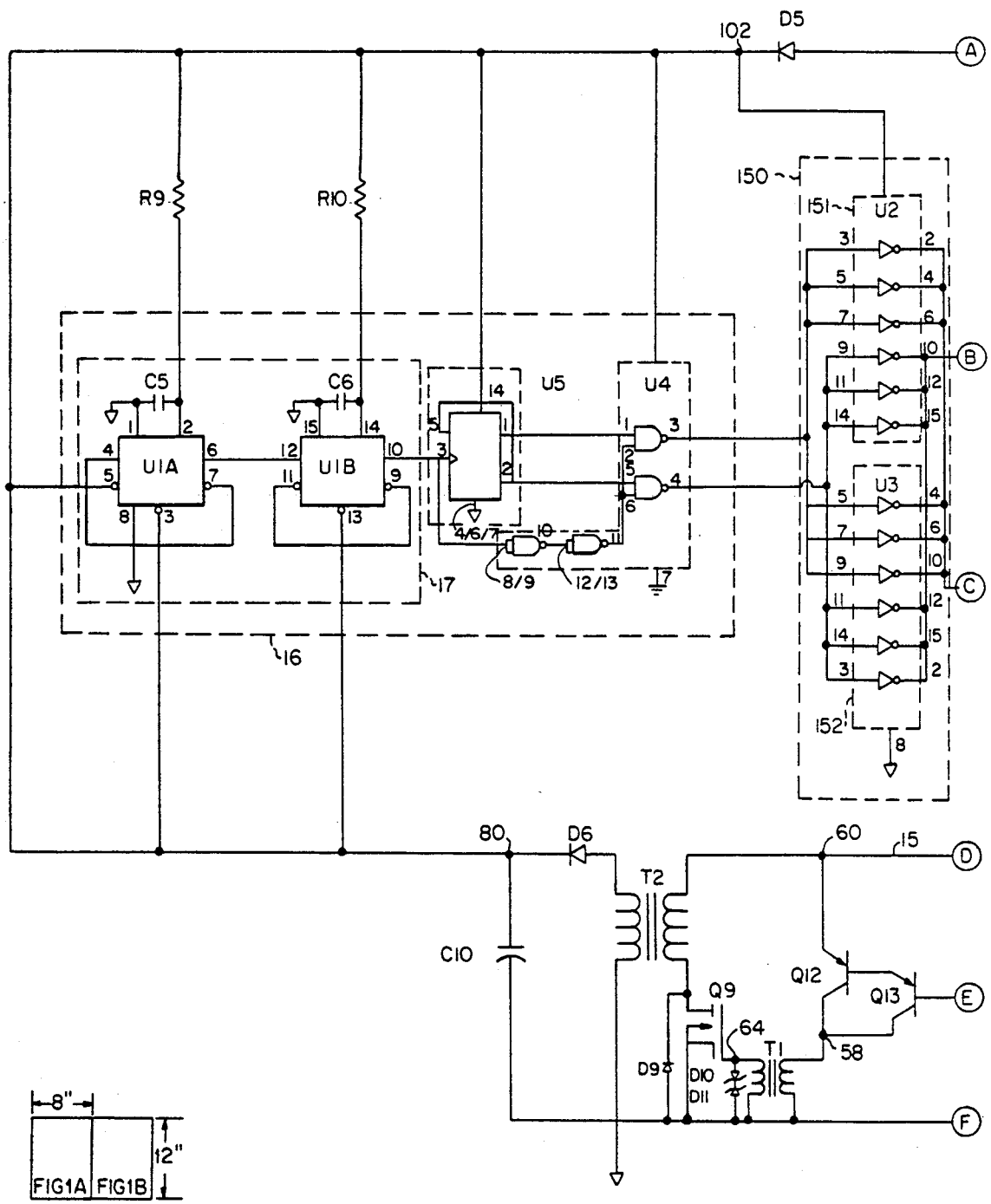
FIG. 1A is one-half of a schematic diagram of a first embodiment of the present invention which supplements FIG 1B.

Referring now to the drawings wherein like reference numerals designate like or similar parts throughout several views there is illustrated in FIG. 1 a power converter 8 shown to be operably coupled to a low voltage dc source such as sea water battery 10. Converter 8 comprises start-up circuit 14 operably coupled to oscillator circuit 16. The output of oscillator circuit U1B16 is directed to conditioning circuit 150, operably coupled to field effect transistor arrays 160 and 162. Conditioning circuit 150 provides current enhancement to the output of oscillator circuit 16 sufficient to switch on field effect transistor arrays U1B160 and 162. Field effect transistor arrays 160 and 162 are switches that direct the output of conditioning circuit 150 to transformer T3, which boosts the voltage level outputs of field effect transistor arrays 160 and 162 to at least 5 vdc, sufficient to drive many solid-state circuits. A full wave rectified housekeeping supply voltage is provided by the output of diode network 100 which is operably coupled to winding W3 of transformer T3. When the output of housekeeping voltage exceeds approximately 5 vdc, start-up circuit 14 is isolated from sea water battery 10 and oscillating circuit 16 to avoid parasitic energy losses.

Still referring to FIG. U1B1, a low voltage dc power source such as sea water battery U1B10 is operably coupled across the inputs to power converter 8 at positive terminal 11a and ground terminal 11b. A pair of optional capacitors C4A and C4B, connected across terminals 11a and 11b, filter minor supply voltage fluctuations.

Still referring to FIG. 1, start-up circuit 14 comprises astable multivibrator 18 including a pair of germanium transistors Q14 and Q15. Germanium transistors are preferred for this application because they are triggered by voltages as low as 0.2 volts, although conventional silicon or field effect transistors may also be used. Positive voltage is provided from terminal 11a to node 12 of germanium transistor start-up circuit 14. The emitter of transistor Q15 receives a positive voltage input from sea water battery 10 through node 12. Capacitor C4C is connected across node 12 and ground. Resistor R18 is operably coupled between the collector of transistor Q15 and ground. The base of transistor Q15 is operably coupled to node 26. Resistor R17 is operably coupled in series with steering diode D7, between nodes 26 and 38. Capacitor C8 is operably coupled between node 26 and node 34. The collector of transistor Q14 is also operably coupled to node 34. Resistor R19 is operably coupled between node 34 and ground. The base of transistor Q14 is operably coupled to node 42. Resistor R16 is operably coupled between node 42 and node 46. Capacitor C9 is operably coupled between node 42 and the collector of transistor Q15. Steering diode D8 is operably coupled between capacitor C9 and resistor R18, and node 46. Diodes D7 and D8 ensures that transisitors Q14 and Q15 are not on at the same time. Resistors R17 and R18, and capacitors C8 and C9 establish the frequency of oscillation of astable multivibrator 18. Resistors R18 and R19 determine the amplification factor of transistors Q15 and Q14, respectively.

The emitter of transistor Q14 is operably coupled to bus 15, operably couple in common with node 12. The output of astable multivibrator circuit 18 is directed from node 34 through buffering resistor R20 to the base of transistor Q13. The base of transistor Q12 is operably coupled to the emitter of transistor Q13. The collector of transistor Q13 is operably coupled to the collector of transistor Q12 at node 58. The emitter of transistor Q12 is operably coupled to node 12. Transistors Q12 and Q13 are operably coupled to form a darlington amplifier which boosts the current strength of the output of astable multiplier 18 to a level sufficient to drive the primary winding of transformer T1.

The primary winding of transformer T1 is operably coupled between node 58 and ground. The secondary winding of transformer T1 is operably coupled between the gate of field effect transistor Q9 and ground, and boosts the voltage at node 58 to a level sufficient to turn on the gate of transistor Q9. Opposed diodes D10 and D11, serially connected between the output of the secondary winding of transformer T1 at node 64 and ground, limit the gate-source voltage of transistor Q9. The primary winding of transformer T2 is operably coupled between bus 15 and the drain of transistor Q9. The secondary winding of transformer T2 is coupled between node 80 and ground. Diode D6 is coupled between the output of transformer T2 and node 80. Capacitor C10, coupled between node 80 and ground dampens the output of start-up circuit 14 so that it approximates a constant DC voltage.

The output of germanium transistor start-up circuit 14 is directed from node 80 to oscillator circuit 16 where it is received by multivibrator 17 which may be implemented as a CMOS dual mode monostable multivibrator in the form of an integrated circuit. By way of example, multivibrator 17 is a Type 4098BE CMOS dual monostable multivibrator implemented as integrated circuits U1A and U1B.

More specifically, while still referring to FIG. 1, the output of start-up circuit 14 is provided to integrated circuit U1A at pin connectors 5 and 3 and through resistor R9 to pin connector 2. Pin number 8 of integratd circuit U1A is operably coupled to ground. Pin numbers 4 and 7 of integrated circuit U1A are operably coupled in common. Capacitor C5 is operably coupled in common between pin numbers U1B1 and 2 of integrated circuit U1A. Pin 1 of integrated circuit U1A is also operably coupled to ground. The purpose of multivibrator 17 is to convert the dc output of start-up circuit 14 into a pulse train output. In the preferred embodiment, the pulse train is in the form of a square wave having a frequency in the range of 17 to 18 Khz. The pulse train frequency is established by carefully choosing the values for the resistance of resistor R9 and capacitance of capacitor C5.

The output of integrated circuit U1A is directed from pin connector 6 thereof to pin connector 12 of integrated circuit U1B. Integrated circuit U1B establishes the pulse width of the square wave output integrated circuit U1A. Pin numbers 9 and 11 of integrated circuit U1B are operably coupled in common. Pin number 13 of integrated circuit U1B is operably coupled to node 80. Capacitor C6 is operably coupled across pin numbers 15 and 14 of integrated circuit U1A. Pin number 15 of integrated circuit U1B is also operably coupled to ground. Resistor R10 is operably coupled between pin number 14 of integrated circuit U1B and node 80. The values for resistor R10 and capacitor C6 are chosen in order to establish the pulse width of the output of integrated circuit U1B which in the preferred embodiment has a pulse width of 98 per cent of 17-18 Khz.

The output of multivibrator 17 is provided to pulse steering network 19 which may be implemented in the form of integrated circuit U5. By way of example, integrated circuit U5 may be Type 4013. Specifically, the output integrated circuit U1B, available at pin connector 10 thereof, is directed to pin connector 3 of integrated circuit U5. Pulse steering circuit 19 transforms the square wave output of integrated circuit U1B into two square wave outputs, available at pin connectors 1 and 2 thereof, having a phase lag therebetween. Pin numbers 2 and 5 of integrated circuit U5 are operably coupled in common. Pin number 14 of integrated circuit U5 is operably coupled to node 80. Pin numbers 4, 6 and 7 of integrated circuit U5 are operably coupled to ground.

The two square wave outputs of pulse steering circuit 19 are each directed to conditioning network 80 which establishes a specific phase lag relationship between them. In the preferred embodiment, conditioning network 80 was implemented as integrated circuit U4 comprising NAND gates 90, 91, 92, and 93. Pin number 1 of integrated circuit U5 is operably coupled to pin number 1 of integrated circuit U4. Pin number 2 of integrated circuit U5 is operably coupled to pin number 5 of integrated circuit U4. Voltage input 94 of integrated circuit U4 is operably coupled to node 80. The outputs of integrated circuit U4 are two square waves each available at pin connectors 3 and 4, respectively, having a phase lag of approximately 180 degrees between themselves.

The output of integrated circuit U1B is provided to integrated circuit U4 at pin connectors 8 and 9. Pin connectors 10 and 12 of integrated circuit U4 are operably coupled in common. Pin connector 11 of integrated circuit U4 is operably coupled to pin connectors 2 and 6 thereof.

The square wave outputs of integrated circuit U4 are directed to invertor network 180 which may comprise invertor arrays 151 and 152 implemented as integrated circuits U2 and U3, each including a plurality of invertors. Invertor arrays 151 and 152 provide current enhancement sufficient to drive field effect transistor arrays 160 and 162, as discussed more fully herein.

By way of example, integrated circuits U2 and U3 may be Type 4049UBE. Pin connector 3 of integrated circuit U4 is operably coupled to pin connectors 3, 5, and 7 of integrated circuits U2 and to pin connectors 5, 7, and 9 of integrated circuit U3. Pin connector 4 of integrated circuit U4 is operably coupled to pin connectors 9, 11, and 14 of integrated circuit U2 and to pin connectors 11, 14, and 3 of integrated circuit U3. Power to integrated circuits U2 and U3 is provided in accordance with techniques well known to those skilled in this technology.

Selected outputs of integrated circuit U2 at pin connectors 2, 4, and 6 and selected outputs of integrated circuit U3 at pin connectors 4, 6, and 10 are connected in common and are directed to field effect transistor array 160 comprising an array of resistors R5–R8 each connected in series with the gates of field effect transistors Q5–Q8. Selected outputs of integrated circuit U2 at pin connectors 10, 12 and 15 and selected outputs of integrated circuit U3 at pin connectors 12, 15, and 2, are connected in common, and are directed field to effect transistor array 162 comprising an array resistors R1–R4 each connected in series with the gates of field effect transistors Q1–Q4. The sources of transistors Q1–Q8 are connected to ground.

The drains of transistors Q1–Q4 are operably coupled to node 3 of first primary winding W1 of transformer T3. The drains of transistors Q5–Q8 are operably coupled to node 1 of primary winding W2 of transformer T3. Secondary windings W4 and W5 of transformer T3 step the voltage output of transistors Q1–Q8 to a higher voltage level. Centertap 2 between primary windings W1 and W2 of transformer T3 is coupled to terminal 11a and receives positive voltage from sea water battery 10. Transistors Q1–Q8 act as switches to control the sequence of application of voltage to transformer T3. Although the description of the prefered embodiment describes a total eight transistors as being included in transistor arrays 162 and 160, however, it is to be understood that any number of transistors may be used in transistor arrays 160 and 162, depending upon the level of switch conduction losses that are considered acceptable for a particular application.

The output across nodes 4 and 5 of secondary winding W3 of transformer T3 is full wave rectified by diode network 100 comprising diodes D1–D4 by techniques well known to those skilled in this technology. The output of rectifier network 100 is connected through serially connected resistor R5 and diode D5, to node 102. Capacitor C1 is coupled between resistor R15 and diode D5, and ground at node 106. The output of rectifier circuit 100 is also provided to start-up network 12 through diodes D13 and D12 and through resistor R32, connected between node 26 and the gate of transistor Q15.

Figure 1B:
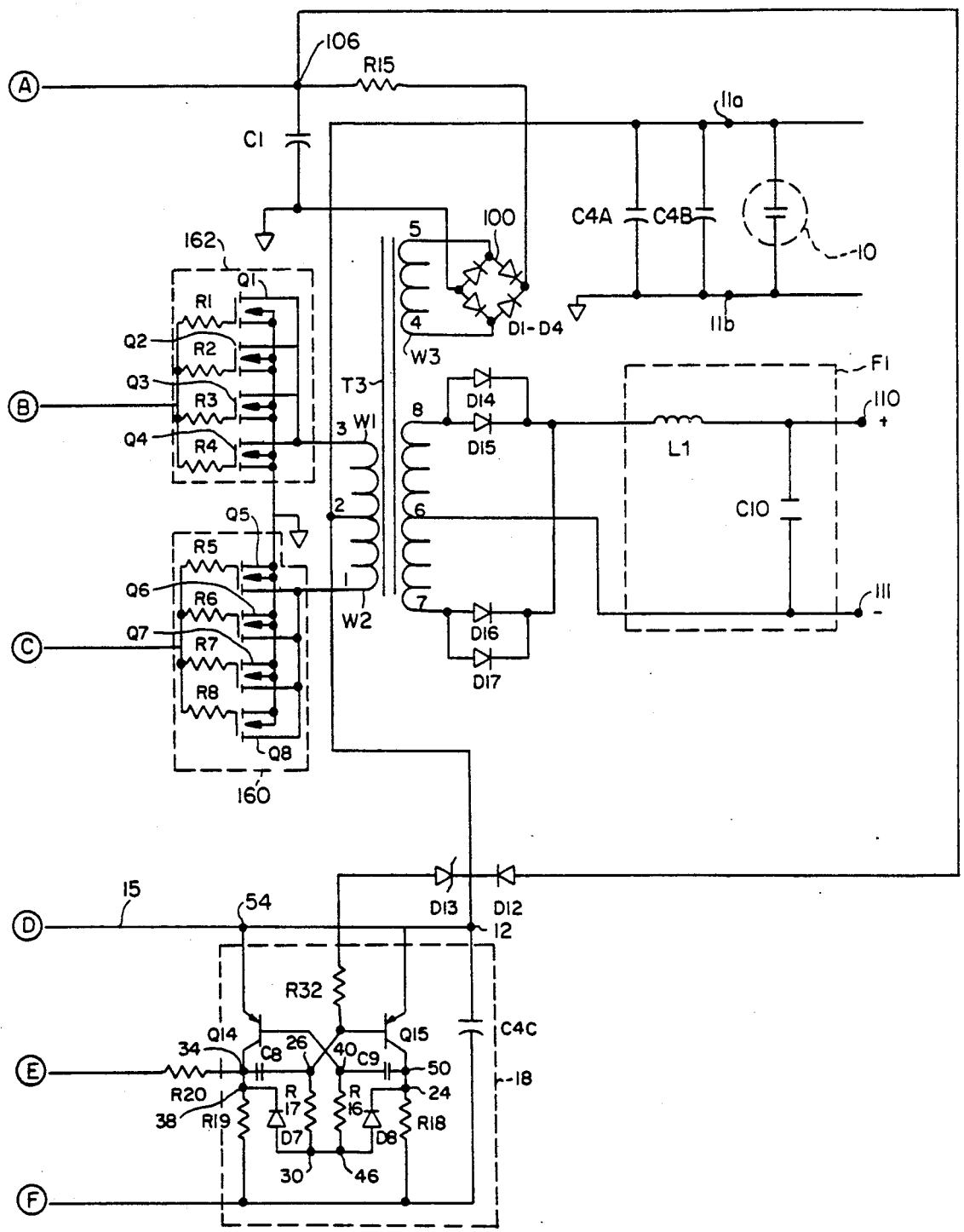
FIG. 1B is one-half of a schematic diagram of a first embodiment of the present invention which supplements FIG. 1A.

In one embodiment of the present invention, illustrated in FIGS. 1A and 1B, the output of secondary windings W4 and W5 of transformer T3 are full wave rectified by diodes D14–D15 and by diodes D16–D17, respectively, which are connected in common to output junction 110. Centertap 6 between secondary windings W4 and W5 of transformer T3 is connected to output junction 111. The output of power converter 8 is available across junctions 110 and 111.

Optional filter F1 may be employed to provide power converter 8 with an output filtered of most voltage transients. Filter F1 comprises inductor L1 connected between the full wave rectified output of transformer T3, available at node 90, and node 110. Capacitor C10 is connected between inductor L1 and node 110, and centertap 6 between secondary windings W4 and W5 of transformer T3.

Figure 2A:
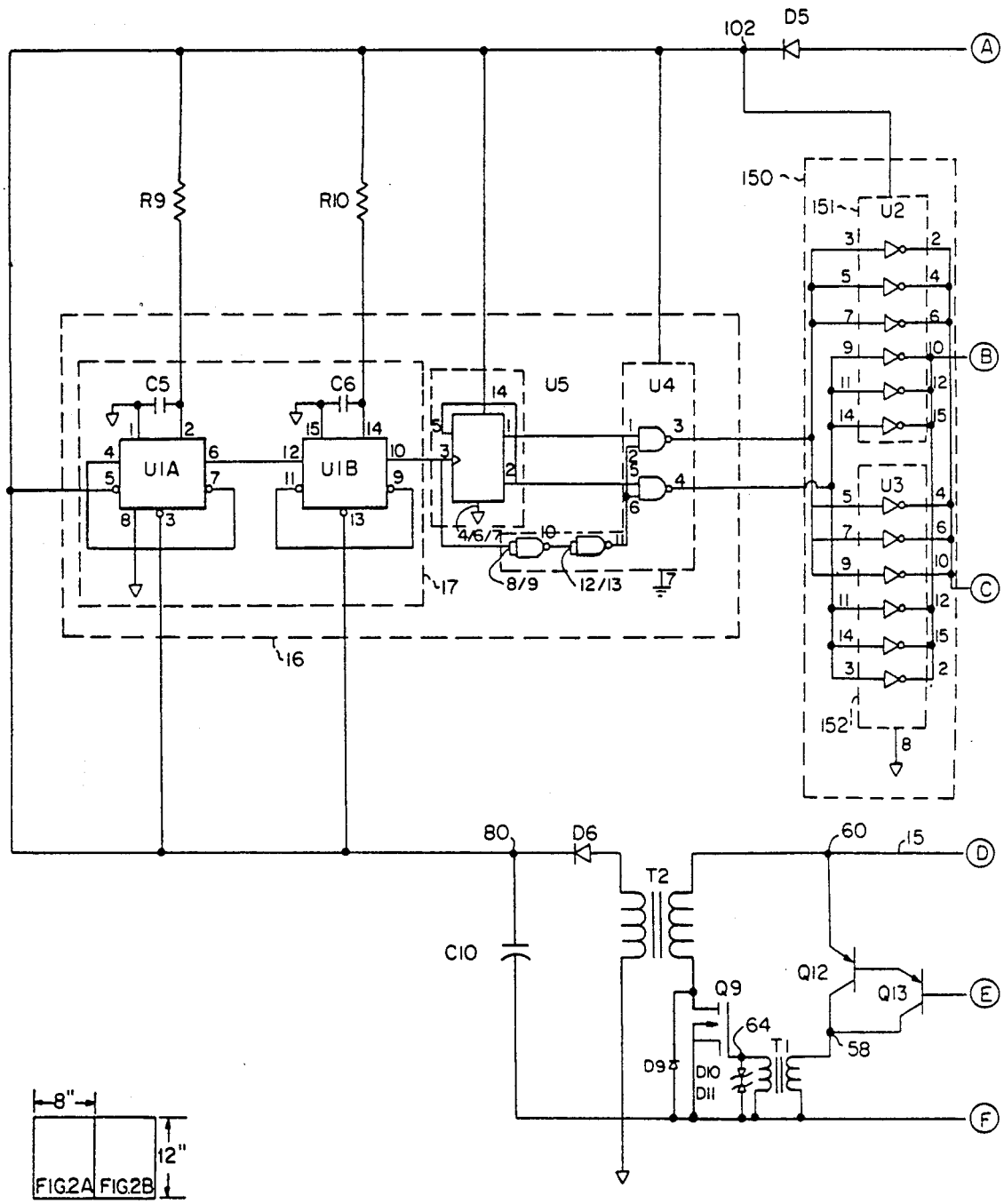
FIG. 2A is one-half of a schematic diagram of a second embodiment of the present invention which supplements FIG. 2B.
Figure 2B:
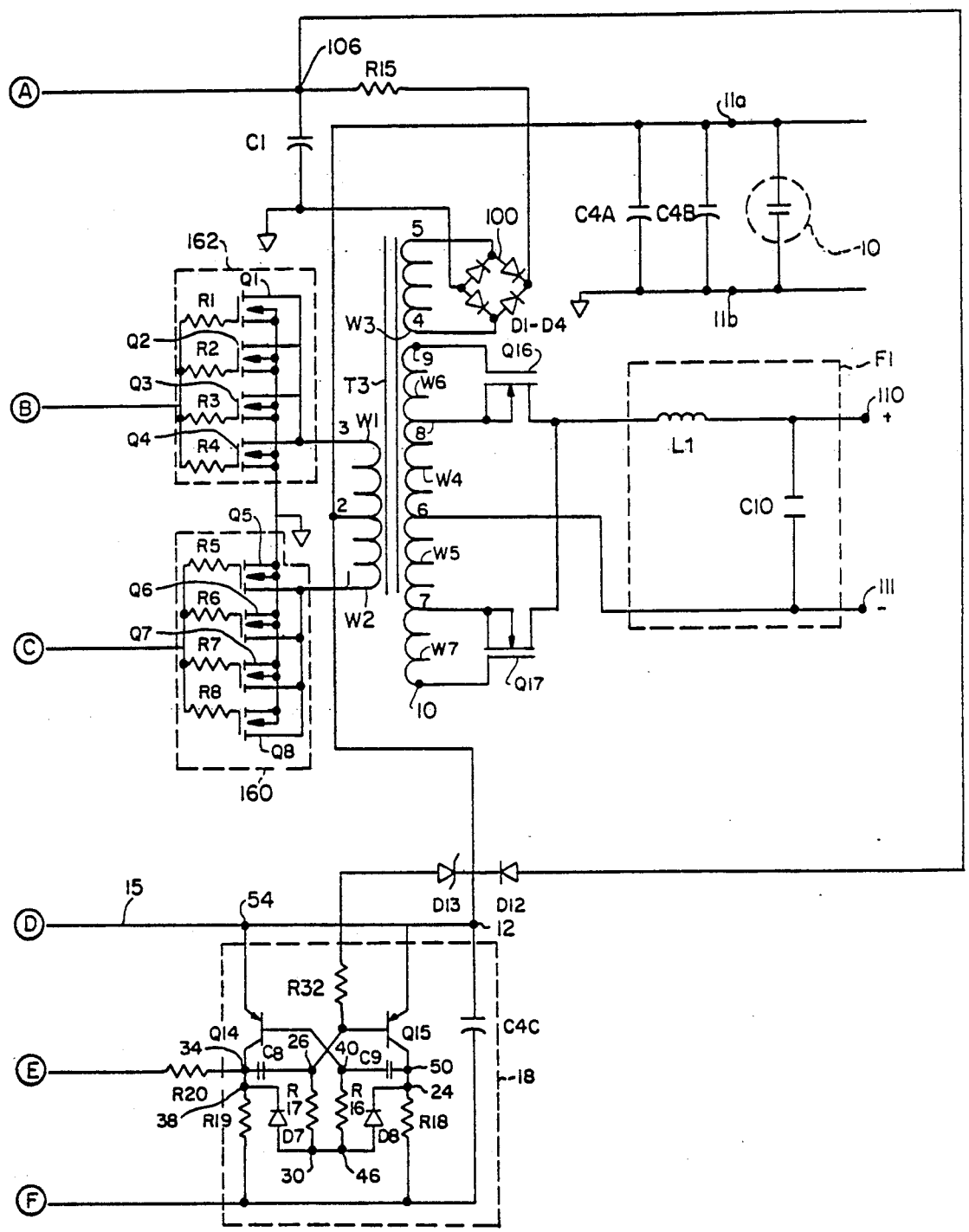
FIG. 2B is one-half of a schematic diagram of a second embodiment of the present invention which supplements FIG. 2A.

A second embodiment of the present invention is illustrated in FIGS. 2A and 2B. The first and second embodiments of the present invention are identical except in the second embodiment, the output of transformer T3 is rectified by synchronous rectifier switches as described more specifically herein. Referring to FIG. 2B, transformer T3 includes secondary windings W6 and W7. Centertap 8 between secondary windings W4 and W6 of transformer T3 is connected to the gate of transistor Q16. The source of transistor Q16 is connected to node 9 of secondary winding W6. The drain of transistor Q16 is connected to inductor L1 in series with output node 110. Centertap 10 between secondary windings W7 and W5 of transformer T3 is connected to the gate of transistor Q17. The source of transistor Q17 is connected to node 10 of secondary winding W7. The drain of transistor Q17 is connected between the drain of transistor Q16 and inductor L1. Transistors Q16 and Q17 are preferably field effect transistors.

OPERATION OF THE INVENTION

In the operation of the power converter 8, germanium transistor start-up circuit 14 initially draws power from a low voltage DC source such as seawater battery 10. Start-up circuit 14 starts to oscillate at a voltage as low as 180 mv. The output of start-up circuit is a voltage much higher than the voltage supply. The elevated voltage is sufficient to drive oscillator circuit 16. Oscillator circuit 16 provides a staggered set of square wave voltage pulses available at pin connectors 3 and 4 of integrated circuit U4. These two pulse trains in turn drive integrated circuits U2 and U3 which provide sufficient power to the gates of transistors Q1–Q4 and Q5–Q8 to switch these transistors on. Transistors Q1–Q4 and Q5–Q8 are paralleled to minimize switching losses. The alternate switching of field effect transistor arrays 160 and 162 applies voltage to either of primary windings 1 or 2 of transformer T3. Pulses of voltage having opposite polarity are developed across secondary windings W4 and W5 of transformer T3, but in the first embodiment of the present invention, illustrated in FIGS. 1A and 1B, diodes D14–D17 only allow one direction of current flow to output junction 110. In the second embodiment of the present invention, field effect transistors function as synchronous rectifier switches to rectify the output of transformer T3. Optional low pass output filter F1 averages the output across junctions 110 and 111 if a DC output is desired. Secondary winding W3 of transformer T3 forms the basis for a housekeeping supply voltage provided by the full wave rectified output of diode network 100. Pulses generated by winding W3 are full wave rectified by diodes D1–D4 and filtered by C1 and R15 to produce dc voltage. When this housekeeping voltage reaches a minimum level, $V_m$, approximately 5 vdc in the preferred embodiment, it is higher than the voltage produced by start-up circuit 14. Diode D5 then is forward biased and diode D6 back biased. This minimum voltage is also higher than the back-bias break-down voltage of diode D13. This condition results in application of the housekeeping voltage through resistor R32 to the gate of transistor Q15. The housekeeping voltage disables start-up circuit 14 and prevents transistors Q14 and Q15 from oscillating, thereby preventing unnecessary power drain from power converter 8.

Integrated circuits U1A and U1B may each be implemented as Type 4098BE; integrated circuit U5 may be a Type 4013; integrated circuit U4 may be implemented as Type 4011B; and integrated circuits U2 and U3 each may be implemented as Type 4049UBE. These microchips are available through RCA and Solid State Scientific. Although the specific embodiment of the present invention has been disclosed and described above as including integrated circuits U1A, U1B, U2, U3, U4, and U5, it is to be understood that the scope of the present invention includes other devices or mechanisms which could be utilized to perform the function of integrated circuits U1A, U1B, U2, U3, U4 and U5. For example, oscillator circuit 16 may be implemented as a pulse width modulated controller which is a well known device to those of ordinary skill in this technology. Conditioning circuit 150 may be implemented as a current buffer, a device well known to those skilled in this technology. Furthermore, discrete components mounted on a circuit card could be utilized, as well as other integrated circuits, or any electronic device that has the capability of performing the functions of the microchips specifically identified hereinabove.

Obviously, many modifications and variations of the present invention are possible in light of the above teachings. It is therefore to be understood that within the scope of the appended claims the invention may be practiced otherwise than as specifically described.

We claim:

1. A power converter for increasing the source voltage of a direct current power source to a higher voltage, comprising:
    first means operably coupled to said direct current power source for generating a first output having a voltage higher than said source voltage;
    second means operably coupled to receive said first output from said first means for generating first and second pulse trains having a voltage and a frequency, f, said first pulse train having a phase lag with respect to said second pulse train;
    a transformer operably coupled to receive said first and second pulse trains from said second means, said transformer providing second, third, and fourth outputs each having a voltage greater than said voltages of said first and second pulse trains;
    third means operably coupled to receive said second and third outputs from said transformer for full wave rectifying said second and third outputs of said transformer;
    fourth means operably coupled to receive said fourth output from said transformer for full wave rectifying said third output; and
    fifth means operably coupled to said first, second, and fourth means for disabling said first means when said fourth output attains a minimum voltage level.

2. The power converter of claim 1 wherein said fifth means includes:
    a first zener diode having a first anode and a first cathode, said first anode operably coupled to said first means;
    a second diode having a second anode and a second cathode, said second cathode operably coupled to said first cathode, said second anode operably coupled to said second and fourth means.

3. The power converter of claim 2 in which said first means includes: an astable multivibrator having first and second germanium transistors.

4. The power converter of claim 3 in which:
    said first pulse train is a first square wave; and
    said second pulse train is a second square wave.

5. The power converter of claim 4 in which said second means further includes:
    sixth means operably coupled to said transformer for alternately providing said first and second square waves to said transformer.

6. The power converter of claim 5 wherein said sixth means further includes:
    a first transistor network operably coupled to said transformer for periodically providing said first square wave to said transformer during a first time period, $T_1$; and
    a second transistor network operably coupled to said transformer for periodically providing said second square wave to said transformer during a second time period, $T_2$, where second period $T_2$ is not coincident with said first time period $T_1$.

7. The power converter of claim 6 wherein:
    said first transistor network includes at least one field effect transistor; and
    said second transistor network includes at least one field effect transistor.

8. The power converter of claim 7 in which said sixth means further includes:
    a first signal conditioning network operably coupled to said first transistor network for providing current enhancement to said first square wave, said first signal conditioning network providing said current enhanced first square wave to said gates of said transistors of said first transistor network; and
    a second signal conditioning network operably coupled to said second transistor network for providing current enhancement to said second square wave, said second signal conditioning network providing said current enhanced second square wave to said gates of said transistors of said second transistor network.

9. The power converter of claim 8 wherein:
    said first signal conditioning circuit comprises:
    a first array of invertors operably coupled in parallel, said first array operably coupled to receive said first square wave; and
    said second signal conditioning circuit comprises:
    a second array of invertors operably coupled in parallel, said second array operably coupled to receive said second square wave.

10. The power converter of claim 9 wherein said transformer includes:
    a first primary winding for receiving said current enhanced first square wave;
    a second primary winding operably coupled to said first primary winding for receiving said current enhanced second square wave;
    a first secondary winding for providing an output having a voltage higher than said voltage of said current enhanced first square wave; and
    a second secondary winding operably coupled to said first secondary winding for providing an output having a voltage higher than said voltage of said current enhanced second square wave.

11. The power converter of claim 10 wherein said third means comprises:
  a first diode network operably coupled to said first secondary winding for providing a rectified output of said first secondary winding at a first node; and
  a second diode network operably coupled to said second secondary winding for providing a rectified output of said second secondary winding at a second node.

12. The power converter of claim 11 wherein:
said first and second nodes are operably coupled at a third node.

13. The power converter of claim 12 in which said second means comprises:
  a first multivibrator operably coupled to receive said first output from said first means for providing a third square wave output at said frequency, f;
  a second multivibrator operably coupled to receive said third square wave output from said first multivibrator for providing an fourth square wave output having a pulse period, $\Gamma$; and
  a push-pull network operably coupled to said second multivibrator for receiving said fourth square wave output and for providing said first and second square waves.

14. The power converter of claim 13 wherein:
said frequency, f, is substantially in the range of 17 to 18 Khz; and
said pulse period is 98 per cent of said frequency, f.

15. The power converter of claim 14 further including:
said transformer having a third secondary winding operably coupled to said fourth means.

* * * * *